United States Patent
Giraud

(10) Patent No.: US 11,878,272 B2
(45) Date of Patent: Jan. 23, 2024

(54) VOLUMETRIC PRESSURE EXCHANGER WITH BOOSTER EFFECT AND INTEGRATED FLOW MEASUREMENT, FOR A SEAWATER DESALINATION PLANT

(71) Applicant: Yves Giraud, Panissieres (FR)

(72) Inventor: Yves Giraud, Panissieres (FR)

( * ) Notice: Subject to any disclaimer, the term of this patent is extended or adjusted under 35 U.S.C. 154(b) by 472 days.

(21) Appl. No.: 17/279,178

(22) PCT Filed: Oct. 1, 2019

(86) PCT No.: PCT/FR2019/052319
§ 371 (c)(1),
(2) Date: Mar. 24, 2021

(87) PCT Pub. No.: WO2020/070435
PCT Pub. Date: Apr. 9, 2020

(65) Prior Publication Data
US 2022/0001330 A1     Jan. 6, 2022

(30) Foreign Application Priority Data

Oct. 3, 2018   (FR) ...................... 1871122

(51) Int. Cl.
*B01D 61/06*     (2006.01)
*B01D 61/02*     (2006.01)
(Continued)

(52) U.S. Cl.
CPC .......... *B01D 61/06* (2013.01); *B01D 61/025* (2013.01); *B01D 61/08* (2013.01); *C02F 1/441* (2013.01);
(Continued)

(58) Field of Classification Search
CPC ....... F04B 9/103; B01D 61/06; B01D 61/025; B01D 61/08; B01D 2313/243;
(Continued)

(56) References Cited

U.S. PATENT DOCUMENTS 4,124,488 A * 11/1978 Wilson .................. B01D 61/06
                                                     417/465
4,367,140 A *  1/1983 Wilson .................. B01D 61/06
                                                    137/599.08
(Continued)

FOREIGN PATENT DOCUMENTS

EP   2368624 A1   9/2011
FR   2953566 A1   6/2011
(Continued)

OTHER PUBLICATIONS

International Search Report issued in PCT Patent Application No. PCT/FR2019/052319 dated Dec. 3, 2019.

*Primary Examiner* — Christopher S Bobish
(74) *Attorney, Agent, or Firm* — MARSHALL, GERSTEIN & BORUN LLP

(57) ABSTRACT

At least one pressure exchange unit with a hollow cylindrical body, a piston sliding in the body, the piston including a piston head separating the interior of the cylindrical body into a downstream chamber and an upstream chamber, the downstream chamber being provided with a device for the admission and discharge of water to be treated, the upstream chamber being provided with a five-way distributor linkage including, for hydraulic balancing, two pressurized liquid supply orifices, two orifices for the evacuation of the liquid and an opening in communication with the upstream chamber.

9 Claims, 2 Drawing Sheets

(51) Int. Cl.
*C02F 1/44* (2023.01)
*F04B 9/103* (2006.01)
*F04B 53/14* (2006.01)
*F04B 53/16* (2006.01)
*F04F 13/00* (2009.01)
*B01D 61/08* (2006.01)
*C02F 103/08* (2006.01)

(52) U.S. Cl.
CPC ............. *F04B 9/103* (2013.01); *F04B 53/14* (2013.01); *F04B 53/16* (2013.01); *F04F 13/00* (2013.01); *B01D 2313/243* (2013.01); *B01D 2313/246* (2013.01); *C02F 2103/08* (2013.01); *C02F 2303/10* (2013.01)

(58) Field of Classification Search
CPC ........... B01D 2313/246; C02F 2103/08; C02F 1/441; C02F 2303/10; F04F 13/00
See application file for complete search history.

(56) References Cited

U.S. PATENT DOCUMENTS

| | | | | |
|---|---|---|---|---|
| 4,637,783 | A * | 1/1987 | Andeen | B01D 61/06 |
| | | | | 417/393 |
| 6,017,200 | A * | 1/2000 | Childs | B01D 61/12 |
| | | | | 417/404 |
| 6,652,741 | B1 * | 11/2003 | Marinzet | B01D 61/06 |
| | | | | 417/313 |
| 8,820,361 | B2 * | 9/2014 | Kawasetsu | F16L 41/08 |
| | | | | 138/109 |
| 9,597,638 | B2 * | 3/2017 | Zhu | B01D 61/12 |
| 9,638,179 | B2 * | 5/2017 | Sivaramakrishnan | F04B 7/00 |
| 9,644,761 | B2 * | 5/2017 | Childs | F16K 31/383 |
| 9,700,843 | B2 * | 7/2017 | Giraud | B01D 61/06 |
| 11,105,345 | B2 * | 8/2021 | Judge | E21B 43/126 |

FOREIGN PATENT DOCUMENTS

| | | |
|---|---|---|
| FR | 2981704 A1 | 4/2013 |
| WO | WO-2018/060755 A1 | 4/2018 |

* cited by examiner

VOLUMETRIC PRESSURE EXCHANGER WITH BOOSTER EFFECT AND INTEGRATED FLOW MEASUREMENT, FOR A SEAWATER DESALINATION PLANT

TECHNICAL FIELD

The present invention relates to a volumetric pressure exchanger with a booster effect and integrated flow measurement, intended for a plant for desalinating seawater by reverse osmosis, as well as to a desalination plant.

PRIOR ART

In plants for the desalination of seawater by reverse osmosis, semi-permeable membranes are fed with seawater supplied at high pressure (generally between 50 and 70 bar). At the outlet from the ROM (reverse osmosis membranes), on the one hand, desalinated water (permeate) is recovered at a pressure close to atmospheric pressure, and supersalty water (concentrate) is recovered on the other hand. The concentrate is at the feed pressure reduced by the pressure drops through the membranes; depending on the plants and the clogging of the membranes, this drop may vary from 1 to 4 bar.

The percentage of permeate with respect to the feed water flow rate is generally between 35% and 50%; this percentage, known as the degree of conversion, mainly varies as a function of the salinity of the water and of its temperature.

It is important to recover the mechanical energy contained in the concentrate with the best possible efficiency and under all the conditions for the variation in the pressure drops and for the variation in the degree of conversion.

There are numerous piston devices which are intended to recover the energy contained in the concentrate leaving the ROMs, but they are necessarily associated with the general process in pressure raising pumps of compensating for pressure drops and with devices for controlling the flow rates into and out of the regenerators in order to adapt the degrees of conversion.

Document FR 2 981 704 illustrates a state of the art volumetric pressure exchanger.

SUMMARY OF THE DISCLOSURE

The invention concerns a volumetric pressure exchanger of the type defined above, comprising at least one pressure exchange unit, said pressure exchange unit comprising a hollow cylindrical body, a piston sliding in said body, said piston comprising a piston head with an impervious seal separating the interior of said cylindrical body into a downstream chamber (untreated water) and an upstream chamber (concentrate), said piston being connected to the crank pin of a crankshaft via a connecting rod, said downstream chamber being provided with a device for the admission and discharge of water to be treated, said upstream chamber being provided with a five-way valve constituted by the cranks of the crankshaft driven by an electric motor controlled by a frequency convertor, said valve comprising two symmetrical orifices for supplying pressurized concentrate, two symmetrical orifices for evacuating said concentrate and an opening for communication with said upstream chamber.

In accordance with one embodiment, the distributor crankshaft comprises two symmetrical cranks, each with an opening for communication and closure, balancing the hydraulic forces applied to the crankshaft.

In accordance with one embodiment, dynamic sealing of said distributor crankshaft is obtained by means of sealing rings with a low coefficient of friction pressed against the cranks of the crankshaft by any mechanical means.

In accordance with one embodiment, dynamic sealing of said distributor crankshaft is obtained by means of sealing rings with a low coefficient of friction pressed against the cranks of the crankshaft by any hydraulic means.

The volumetric pressure exchanger in accordance with the invention may comprise a plurality of pressure exchange units as described, and ideally five or seven units.

In accordance with one embodiment, the motorized drive means are connected via gears and each unit is offset by an angle so as to distribute the flows over 360°.

The number of pressure units, the bore and the stroke of the cylindrical bodies are defined as a function of the available flow of concentrate of the plant; the speed of rotation of the linkage is automatically adjusted as a function of the desired flow rate through the exchanger in order to adapt it to the desired degree of conversion.

BRIEF DESCRIPTION OF THE DRAWINGS

Other features and advantages of the invention will become apparent from the following description, which is given by way of non-limiting indication and made with reference to the accompanying figures, in which.

DETAILED DISCLOSURE

Figure 1:
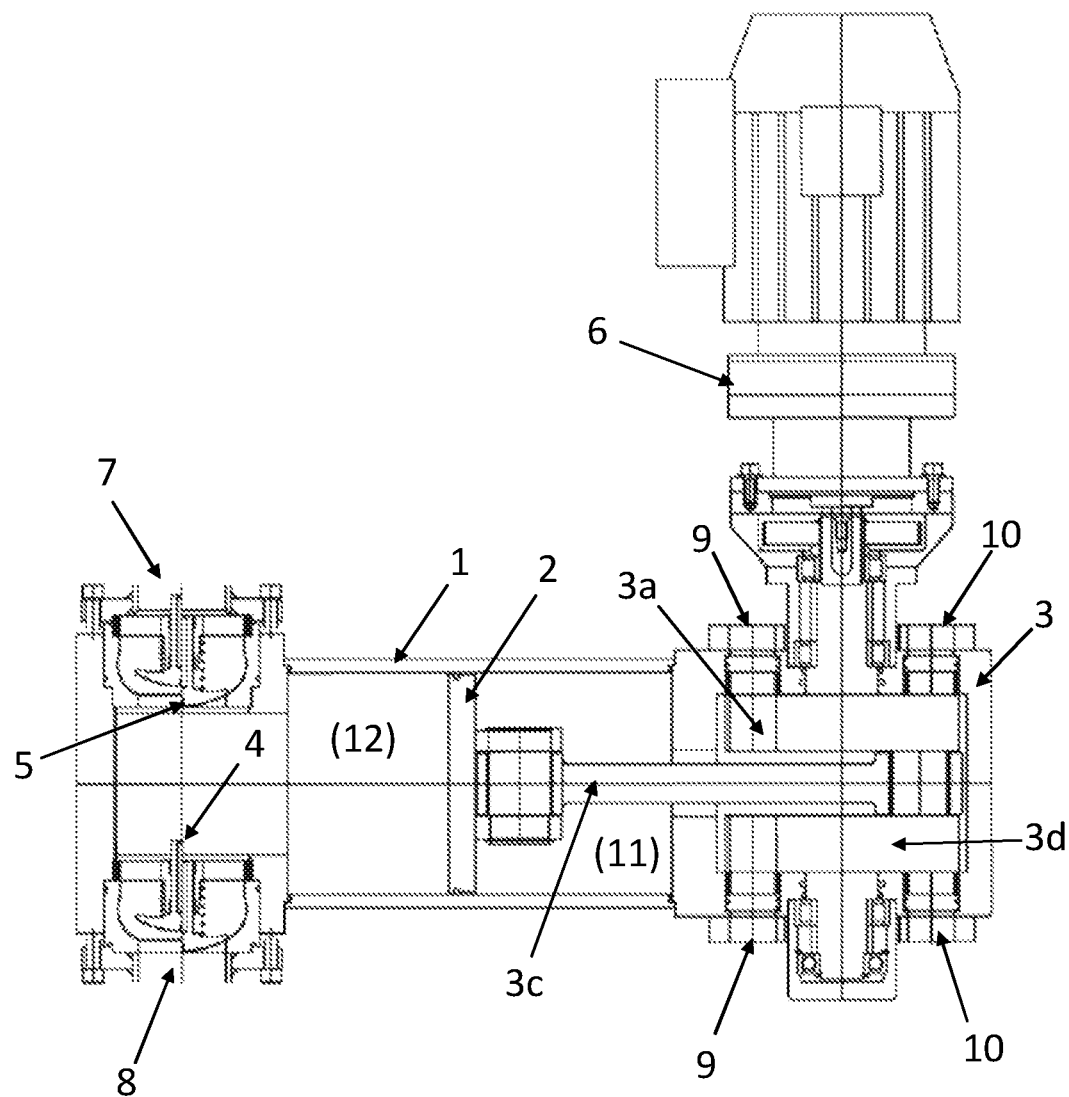
FIG. 1 shows, in section, a pressure exchange unit, the central portion of which is constituted by a cylindrical body in which a piston slides which is connected to the crankshaft via a connecting rod.

FIG. 1 shows a pressure exchange unit the central portion of which is constituted by a cylindrical body (1) in which a piston (2) slides which is connected to the crankshaft (3d) via a connecting rod (3c), forming a distributor linkage (3). The piston (2) separates and seals off the interior of the cylindrical body (1) into a downstream chamber and an upstream chamber. The cylindrical body (1) is extended at its first end, on the downstream chamber side, by a block which is secured to the cylindrical body (1) in a sealed manner by means of gaskets and bolts, which are known per se.

The block includes an inlet orifice for supplying seawater to be treated with an inlet check valve (4) which is known per se to the person skilled in the art. The block also includes a discharge orifice supplying seawater to the ROM, also comprising a check valve (5).

The other end of the cylindrical body (1), on the upstream chamber side, is extended by a block incorporating the distributor linkage (3) which is secured by means of gaskets and bolts, which are known per se.

The cranks of the linkage (3) each comprise a supply orifice (3a) with a particular shape which at each turn alternately places the inlets for the pressurized concentrate in communication with the upstream chamber of the cylinder (1) and places the outlets for the concentrate, from which energy has been recovered, in communication with the upstream chamber of the cylinder (1). It should be noted that the system distributes and seals the various channels without placing axial thrust on the crankshaft (3d).

The shaft of the crankshaft (3d) is connected to a drive device which is itself driven by one or more motors (6), for example by means of gears. The motor or motors (6) ensure the rotation of the distributor linkage (3) at a controlled speed by means of a frequency convertor in order to adapt it to the desired degree of conversion and provide the energy necessary to compensate for the pressure drops of the ROM with a very high efficiency compared with the usual process in which the pressure is raised by means of an independent centrifugal feeding pump.

The pressure exchange the structure of which has been described above unit operates as follows:

Seawater, supplied via a feeding pump of the desalination plant, enters the block via the valve (4) and therefore enters into the interior of the downstream chamber of the cylindrical body (1), without regulating the inlet pressure, and leaves it via the discharge valve (5). The crankshaft (3d) rotates continuously.

At the beginning of a cycle, when the piston (2) is to the right in the reversal of movement position, the supply orifices (3a) for supplying concentrate enter into communication with the high pressure inlets, the concentrate enters the upstream chamber of the cylindrical body (1), with the downstream chamber being filled with seawater.

The piston moves to the left, discharging the untreated seawater via the valve (5), pushed by the concentrate and assisted by the drive motors with an expenditure of energy corresponding to the required rise in pressure.

When the piston arrives at the end of the stroke on the left, the orifices (3a) simultaneously shut down the communication with the high pressure inlets for the concentrate and open the communication with the outlets for the concentrate from which the energy has been taken. The consequential depressurization of both sides of the piston (2) causes the closure of the valve (5), the untreated seawater supplied via a feeding pump of the plant enters via the valve (4) and pushes the piston (2) to the right, delivering the concentrate for a new cycle. In contrast to known systems, any surplus energy contained in the seawater originating from the feeding pump is recovered and assists the motors in ensuring rotation and the rise in pressure. In the event of insufficient supply pressure, which is unacceptable in other known systems, the motors supply the energy necessary for evacuating the concentrate.

For greater precision, the references in FIG. 1 relating to the position of the water to be treated and the treated water are given below:

(7): high pressure untreated water outlet;
(8): low pressure untreated water inlet;
(9): high pressure supersalty water inlet;
(10): low-pressure supersalty water outlet;
(11): supersalty water;
(12): untreated water.

Figure 2:
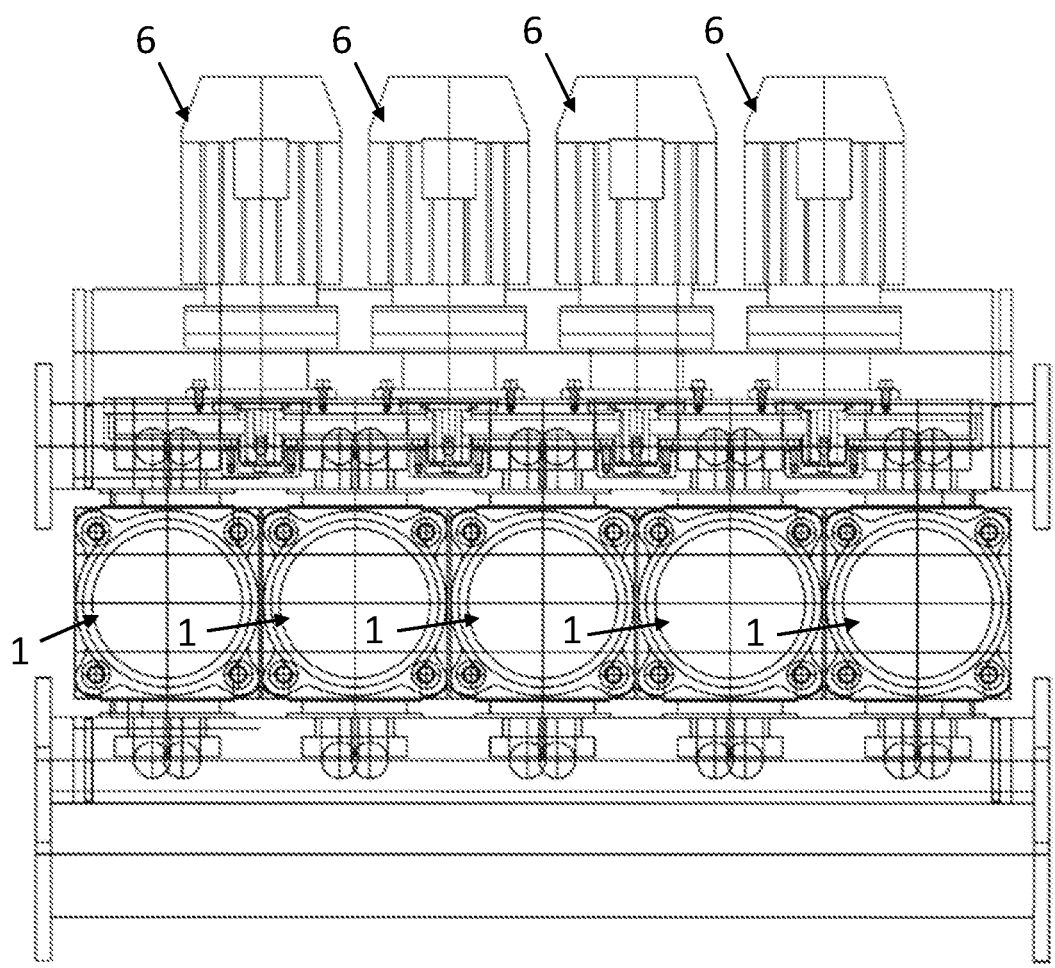
FIG. 2 shows a volumetric pressure exchanger comprising five pressure exchange units of the type shown in FIG. 1, mounted in parallel.

FIG. 2 shows a volumetric pressure exchanger comprising five pressure exchange units of the type shown in FIG. 1, mounted in parallel. Electric geared motors ensure the rotation of the five distributor links which are offset from one another by 72° so as to ensure smooth operation of the system.

The number, the diameter and the stroke of the cylinders define the system as a high-precision flow meter; this feature makes it possible, with a simple controller, to vary the speed of rotation in order to adapt the flow rate through the pressure exchanger to the desired degree of conversion.

In summary, the volumetric pressure exchanger in accordance with the invention offers the following characteristics and advantages:

low energy consumption of the distribution system;
pressure rise by the volumetric system with higher efficiency than centrifugal pumps and without the consumption of the concentrate flow for the function;
no concentrate/seawater mixing due to the total imperviousness of the separator piston;
no leakage of the distributor system because of the augmented sealing rings;
partial recovery of the energy contained in the untreated water supplied by the feeding pumps;
no regulations are applicable to the untreated water supply, the high pressure untreated water outlet, the high pressure concentrate supply or the low pressure concentrate outlet;
adaptability to the desired degree of conversion by controlling the speed of rotation;
no risk of water hammer;
quiet operation;
possibilities for very high throughputs;
small footprint, few and short connecting pipework;
simple and inexpensive maintenance;
the system does not require water filtration below 50 microns.

The invention claimed is:

1. A volumetric pressure exchanger with a booster effect and flow measurement, comprising at least one pressure exchange unit with a hollow cylindrical body, a piston sliding in said body, said piston comprising a piston head separating an interior of said cylindrical body into a downstream chamber and an upstream chamber, said downstream chamber being provided with a device for an admission and discharge of water to be treated, wherein said upstream chamber is provided with a motorized five-way distributor linkage comprising, for hydraulic balancing, two pressurized liquid supply orifices, two orifices for evacuating said liquid and an opening which is in communication with said upstream chamber, wherein said motorized five-way distributor linkage is hydraulically balanced in order to remove axial stress on an axis of rotation of the motorized five-way distributor linkage.

2. The volumetric pressure exchanger according to claim 1, wherein the five-way motorized distributor linkage provides for recovery of a pressure due to a pressure drop from a reverse osmosis membrane, without an external pump or consumption of flow.

3. The volumetric pressure exchanger according to claim 1, wherein cranks of the five-way motorized distributor linkage comprises cranks having symmetrical openings which are shaped to allow alternate fluid communication and an end to fluid communication with the supply orifices of the volumetric pressure exchanger.

4. The volumetric pressure exchanger according to claim 1, wherein the exchanger comprises a plurality of pressure exchange units, each of the pressure exchange unit comprising a hollow cylindrical body with an upstream chamber provided with a motorized five-way distributor linkage.

5. The volumetric pressure exchanger as claimed in claim 4, wherein the five-way motorized distributor linkages are offset in a manner which is evenly distributed over 360° depending on a number of pressure exchange units.

6. The volumetric pressure exchanger according to claim 4, wherein a displacement, a controlled speed of rotation of the five-way motorized distributor linkage and a number of pressure exchange units determine of a throughput of the volumetric pressure exchanger.

7. The volumetric pressure exchanger according to claim 1, wherein an energy arriving via an inlet orifice of the downstream chamber is recovered via the five-way motorized distributor linkage and assists in raising pressure.

8. A desalination plant containing a volumetric pressure exchanger according to claim 1, wherein a number of pressure exchange units, a bore and a stroke of hollow cylindrical bodies are defined as a function of an available flow of concentrate of the desalination plant.

9. The desalination plant according to claim 8, wherein a rotational speed of the five-way motorized distributor linkages varies in a manner such that a desired degree of conversion is automatically adjusted.

* * * * *